(12) United States Patent
Karas et al.

(10) Patent No.: US 8,407,143 B2
(45) Date of Patent: Mar. 26, 2013

(54) INTERNATIONAL NEGOTIABLE INSTRUMENT PAYMENT

(75) Inventors: Peter M. Karas, Lakewood, CO (US);
Richard G. Wilber, Denver, CO (US);
Mark D. Baumgart, Larkspur, CO (US);
Chris Trujillo, Denver, CO (US)

(73) Assignee: The Western Union Company, Englewood, CO (US)

( * ) Notice: Subject to any disclaimer, the term of this patent is extended or adjusted under 35 U.S.C. 154(b) by 2923 days.

(21) Appl. No.: 10/109,559

(22) Filed: Mar. 27, 2002

(65) Prior Publication Data

US 2003/0187789 A1 Oct. 2, 2003

(51) Int. Cl.
*G06Q 40/00* (2012.01)
(52) U.S. Cl. .......................................... 705/40; 705/39
(58) Field of Classification Search ............... 705/39–42
See application file for complete search history.

(56) References Cited

U.S. PATENT DOCUMENTS

| | | |
|---|---|---|
| 5,220,501 A | 6/1993 | Lawlor et al. |
| 5,326,960 A | 7/1994 | Tannenbaum |
| 5,350,906 A | 9/1994 | Brody et al. |
| 5,369,709 A | 11/1994 | Foreman et al. |
| 5,699,528 A | 12/1997 | Hogan |
| 5,757,917 A | 5/1998 | Rose et al. |
| 5,826,241 A | 10/1998 | Stein et al. |
| 5,845,265 A | 12/1998 | Woolston |
| 5,920,629 A | 7/1999 | Rosen |
| 5,978,485 A | 11/1999 | Rosen |
| 6,012,048 A | 1/2000 | Gustin et al. |
| 6,029,150 A | 2/2000 | Kravitz |
| 6,061,665 A | 5/2000 | Bahreman |
| 6,064,990 A | 5/2000 | Goldsmith |
| 6,070,798 A | 6/2000 | Nethery |

(Continued)

FOREIGN PATENT DOCUMENTS

| | | |
|---|---|---|
| CA | 2 332 715 A1 | 8/2001 |
| EP | 0 949 596 A2 | 10/1999 |

(Continued)

OTHER PUBLICATIONS

John Downes Jordan Elliot Goodman, Barron's Dictionary of Finance and Investment Terms, Barron's Financial Guides, 5$^{th}$ Edition, Copyright 1998.*

(Continued)

*Primary Examiner* — Hani M Kazimi
(74) *Attorney, Agent, or Firm* — Kilpatrick Townsend & Stockton LLP

(57) ABSTRACT

According to the invention, a method for purchasing a negotiable instrument from an online payment system by a payor to compensate a payee in relation to a listing on a vending site is disclosed. In one step, a payment currency and/or a drawee bank nationality is selected for the online payment system to use when issuing the payment instrument. Payment information is received from the payor and comprises at least two of: a payee identifier, a payee name, a payee address, and a payment amount. A money handler associated with the payor is debited for at least the payment amount. The payment instrument payable to the payee name for the payment amount is generated. That payment instrument is based on at least one of the payment currency and the drawee bank nationality. The payment currency is different from a currency used by the money handler. The payment instrument is delivered to the payee.

18 Claims, 7 Drawing Sheets

U.S. PATENT DOCUMENTS

| | | | |
|---|---|---|---|
| 6,098,053 A * | 8/2000 | Slater | 705/44 |
| 6,119,106 A | 9/2000 | Mersky et al. | |
| 6,122,625 A * | 9/2000 | Rosen | 705/65 |
| 6,246,996 B1 | 6/2001 | Stein et al. | |
| 6,282,522 B1 | 8/2001 | Davis et al. | |
| 6,308,887 B1 | 10/2001 | Korman et al. | |
| 6,311,170 B1 | 10/2001 | Embrey | |
| 6,351,739 B1 | 2/2002 | Egendorf | |
| 6,367,693 B1 * | 4/2002 | Novogrod | 235/379 |
| 6,460,020 B1 * | 10/2002 | Pool et al. | 705/26 |
| 6,814,282 B2 | 11/2004 | Seifert et al. | |
| 7,039,603 B2 | 5/2006 | Walker et al. | |
| 7,104,440 B2 | 9/2006 | Hansen et al. | |
| 7,177,836 B1 * | 2/2007 | German et al. | 705/40 |
| 7,229,011 B2 | 6/2007 | Hansen et al. | |
| 7,499,875 B1 | 3/2009 | May et al. | |
| 2002/0016769 A1 | 2/2002 | Barbara et al. | |
| 2002/0029190 A1 | 3/2002 | Gutierrez-Sheris | |
| 2002/0032651 A1 | 3/2002 | Embrey | |
| 2002/0052841 A1 | 5/2002 | Guthrie et al. | |
| 2002/0069166 A1 * | 6/2002 | Moreau et al. | 705/40 |
| 2002/0073008 A1 | 6/2002 | Dutta et al. | |
| 2002/0087469 A1 | 7/2002 | Ganesan et al. | |
| 2002/0104878 A1 | 8/2002 | Seifert et al. | |
| 2002/0111907 A1 | 8/2002 | Ling | |
| 2002/0120846 A1 * | 8/2002 | Stewart et al. | 713/168 |
| 2002/0139849 A1 | 10/2002 | Gangi | |
| 2002/0156734 A1 | 10/2002 | Yamamoto | |
| 2003/0024979 A1 | 2/2003 | Hansen et al. | |
| 2003/0028491 A1 | 2/2003 | Cooper | |
| 2003/0074310 A1 | 4/2003 | Grovit et al. | |
| 2003/0105710 A1 | 6/2003 | Barbara et al. | |
| 2003/0130959 A1 | 7/2003 | Rosenbaum | |
| 2006/0085452 A1 | 4/2006 | Cope | |
| 2006/0116957 A1 | 6/2006 | May et al. | |
| 2007/0061257 A1 | 3/2007 | Neofytides et al. | |
| 2007/0061258 A1 | 3/2007 | Neofytides et al. | |
| 2007/0118472 A1 | 5/2007 | Allen-Rouman et al. | |
| 2007/0136189 A1 | 6/2007 | German et al. | |
| 2007/0136192 A1 | 6/2007 | German et al. | |
| 2007/0143209 A1 | 6/2007 | German et al. | |

FOREIGN PATENT DOCUMENTS

| | | |
|---|---|---|
| EP | 1 077 436 A2 | 2/2001 |
| WO | WO 96/08783 A | 3/1996 |
| WO | WO 00/22559 A1 | 4/2000 |
| WO | WO 00/46725 A1 | 8/2000 |
| WO | WO 00/67177 A2 | 11/2000 |
| WO | WO 00/79452 A2 | 12/2000 |
| WO | WO 01/24082 A1 | 4/2001 |
| WO | WO 01/53977 A2 | 7/2001 |
| WO | WO 01/71452 A2 | 9/2001 |
| WO | WO 01/86597 A | 11/2001 |
| WO | WO 02/05195 A1 | 1/2002 |
| WO | WO 02/19211 A1 | 3/2002 |
| WO | WO 02/059847 A | 8/2002 |

OTHER PUBLICATIONS

Business Wire, *E-Commerce, Email and E-greeting Cards Combine in New Web Site Designed by Interactive Bureau; Flooz.com Features a Fun Online Gift Currency You Send by Email for Any Occasion*, downloaded from website http://www.proquest.umi.com.

IDEALAB Company, PayMe.com, downloaded from website https://ssl.idealab.com/ on Feb. 16, 2000.

Confinity, Inc., PayPal.com, How PayPal.com Works, downloaded from website http://www.paypal.com/ on Feb. 7, 2000.

American Banker Inc.—Bond Buyer 2001, *In Brief: Fortex, Travel Checks on B of A Site*, American Banker, New York, NY, May 18, 2001, vol. 166, Issue 96, downloaded from http://proquest.umi.com.

Phillips Business Information, LLC, *Netbank Cuts Deal With Thomas Cook to Offer Travel Money On-Line*, Card New, Potomac, Sep. 5, 2001, vol. 16, Issue 17, downloaded from http://proquest.umi.com.

Moozakis, Chuck. *Hubs Ready E-Settlement*, InternetWeek, Dec. 4, 2000, downloaded from website http://proquest.umi.com.

Talmor, Sharona, *Product File*, The Banker, Mar. 1995, vol. 145, No. 829, downloaded from website http://proquest.umi.com.

*Citigroup Taps Commerce One for Portal*, Corporate EFT Report, Mar. 1, 2000, vol. 20, No. 4, downloaded from website http://proquest.umi.com.

Author Unknown "Online Payment Services" www.auctionbytes.com/cab/pages/payment, compiled Nov. 2002, 3 pages.

Author Unknown "PayPal News", www.andrys.com/paypal.html, published prior to 2003, 3 pages.

Author Unknown "PayPal.com Case Study" http://fox.rollins.edu/~slackman/paypal.htm, 2001, 6 pages.

Boneh, Dan "Beaming Money by Email is Web's Next killer App", PR Newswire, Nov. 16, 1999, pp. 1-4.

Business Editors and High-Tech Writers "billserv.com Launches bills.com, an Internet Portal for Consumers to Pay Bills Online at No Cost" Business Wire, Feb. 22, 2000, pp. 1-2, New York.

Confinity, Inc. "PayPal for the Palm", www.handheldnew.com/file.asp?ObjectID=5401, published prior to Oct. 2003, 2 pages.

Epper Hoffman, Karen "PayPal Still Running Free, But the e-payments company's carefree days may be numbered if regulators decide it's essentially a bank" Bank Technology News, published between 2001-2003, www.banktechnews.com/btn/articles/btnoct01-13.shtml, 3 pages.

Latour, Almar "PayPal Electronic Plan May be on the Money in Years to Come", The Wall Stret Journal Interactive Edition, Nov. 15, 1999, downloaded from www.paypal.com/html/wsj.html, 2 pages.

Plotkin, Hal "Beam Me Up Some Cash" Silicon Valley Insider; Sep. 8, 1999, www.halplotkin.com/cnbcs29.htm, 3 pages.

Steiner, Ina "PayPal Online Payment Service—Another Way to Pay for Auction Items" www.auctionbytes.com, Feb. 20, 2000, 4 pages.

Wijnen, Rene "You've Got Moneyl", Technology News, Jun. 2000, pp. 1-4, vol. 13, Issue 6, New York.

"Cash Technologies Receives U.S. Patent Office Approval for Its 9-Commerce Technology," PR Newswire, New York, Apr. 25, 2001, http://proquest.umi.com/pqdweb?did=71746775&sid=1&Fmt=3&clientId=19649&RQT=309&VName=PQD, 2 pages.

"Cash Technologies Signs Strategic Alliance Agreement with Western Union," PR Newswire, New York, Mar. 8, 2001, http://proquest.umi.com/pqdweb?did=69339513&sid=1&Fmt=3&clientId=19649&RQT=309&VName=PQD, 2 pages.

"Citibank's c2it Goes Global with International Funds Transfers Capability," Business Editors, Business Wire, New York, May 22, 2001, http://proquest.umi.com/pqdweb?did=73206633&sid=7&Fmt=3&clientId=19649&RQT=309&VName=PQD, 4 pages.

BidPay.com, [retrieved on Jul. 7, 2011], http://web.archive.org/web/20001201225000/www.bidpay.com/terms.htm, 3 pages.

"Western Union Announces Newest Member of Financial Sevices Family of Companies," PR Newswire, New York, Jul. 19, 2001, http:/proquest.umi.com/pqdweb?did=75536711&sid=4&Fmt=3&clientId=19649&RQT=309&VName=PQD, 4 pages.

"Internet Money Transfers," The Nilson Reprot, Los Angeles, Mar. 2000, (abstract) http://proquest.umi.com/pqdweb?did=52713844&sid=3&Fmt=2&clientId=19649&RQT=309&VName=PQD, 1 page.

\* cited by examiner

INTERNATIONAL NEGOTIABLE INSTRUMENT PAYMENT

BACKGROUND OF THE INVENTION

This invention relates in general to online payment systems and, more specifically, to Internet-based payment systems that use negotiable instruments for payments to non-merchant parties such as individuals.

There are online systems that allow paying parties that may not have a merchant account with a credit card company or bank. Further, some parties do not even have a personal bank account to accept payment into. In these situations, a money order may be used to pay for merchandise, services or to otherwise send money. There are systems that automate the process of sending money orders through use of an online system where a payor can have a money order generated and mailed to the payee. A bank account or credit card is used by the online system to fund the money order and pay any service fees. These online systems are commonly used to pay for online auction transactions where the buyer and seller may not be in the same city or country.

Where the payee is in a country using a different currency, cashing a foreign money order is problematic. Although money exchanges and banks can cash a foreign money order, the exchange rate may be unfavorable and service fees may be added to the transaction. Further, a foreign bank cashing the money order may place a hold on the availability of the funds until they clear, which can take months. Where the money order is in payment for an auction, the fees and other costs deducted from the payment limit the profit on the auction. These impediments to commerce serve to impede transactions in different currencies.

BRIEF DESCRIPTION OF THE DRAWINGS

The present invention is described in conjunction with the appended figures.

Figure 1:
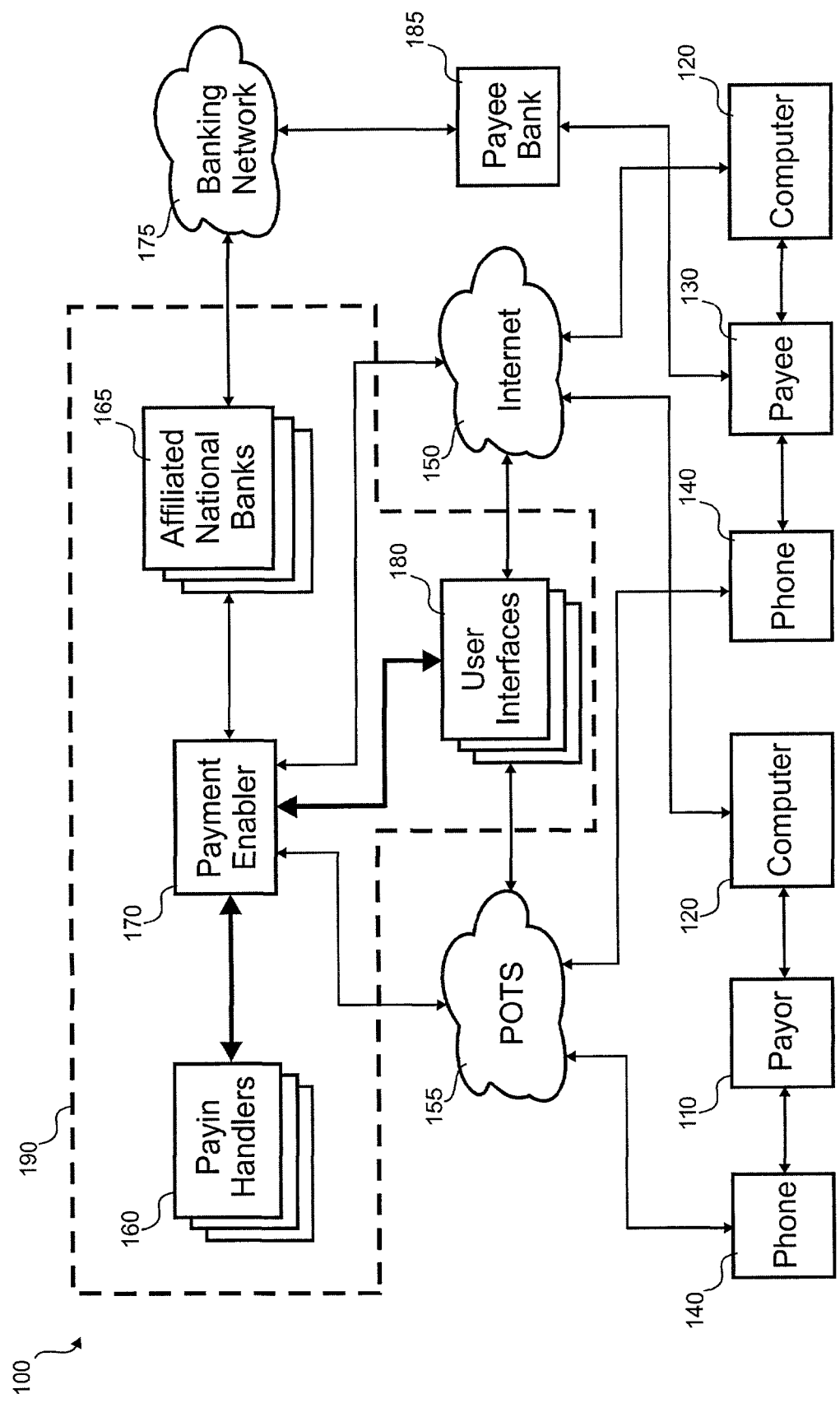
FIG. 1 is a block diagram of an embodiment of an international negotiable instrument payment system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

The present invention provides for paying sellers with a negotiable instrument, such as a money order, even though the seller may want payment in a foreign currency and drawn on a foreign bank. In one embodiment, a method for purchasing a negotiable instrument from an online payment system by a payor to compensate a payee in relation to a listing on a vending site is disclosed. In one step, a payment currency and/or a drawee bank nationality is selected for the online payment system to use when issuing the negotiable instrument. Payment information is received from the payor and comprises at least two of: a payee identifier, a payee name, a payee address, and a payment amount. A money handler associated with the payor is debited for at least the payment amount. The negotiable instrument payable to the payee name for the payment amount is generated. That negotiable instrument is based on at least one of the payment currency and the drawee bank nationality. The payment currency is different from a currency used by the money handler. The negotiable instrument is delivered to the payee.

In another embodiment, a method for producing a negotiable instrument from an online payment system to compensate a payee for transactions with a number of payors is disclosed. In one step, a selection of at least one of a payment currency and a drawee bank nationality for the online payment system is received for use when issuing the negotiable instrument. A first payment information is received from a first payor, wherein the first payment information comprises a first payee identifier and a first payment amount. A first money handler associated the first payor is debited for at least the first payment amount. A second payment information is received from a second payor. The second payment information comprises a second payee identifier and a second payment amount. The first payee identifier and second payee identifier both correspond to the payee and may be the same. A second money handler associated the second payor is debited for at least the second payment amount. But, the first and second money handlers may be the same. A determination is made as to whether an event is satisfied, where the event is at least one of an monetary event and a temporal event. A negotiable instrument payable is generated for the payee when the event is satisfied. An amount of the negotiable instrument is equal to or larger than a sum of the first and second payment amounts minus any fees. The negotiable instrument uses at least one of the payment currency and the drawee bank nationality specified above. The payment currency is different from a currency used by at least one of the first and second money handlers. The negotiable instrument is delivered to the payee.

In yet another embodiment, a method for producing a negotiable instrument from an online payment system to compensate a payee for a transaction with one or more payors. In one step, a selection of at least one of a payment currency and a drawee bank nationality for the online payment system is received for use when issuing the negotiable instrument. Payment information is received from the payor comprising at least two of: a payee identifier, a payee name, a payee address, and a payment amount. A money handler associated with the payor is debited for at least the payment amount. Determining if an event is satisfied, where the event is at least one of an monetary event and a temporal event. A negotiable instrument is caused to be generated which is payable to the payee name for the payment amount after the payment information is received and the event is satisfied. The negotiable instrument uses at least one of the payment currency and the drawee bank nationality specified above. In this embodiment, one of these conditions is true: the payment currency is different from a currency used by the money handler or the drawee bank nationality is different from a nationality used by the money handler. The negotiable instrument is delivered to the payee.

Referring first to FIG. 1, a block diagram of an embodiment of an international negotiable instrument payment system 100 is shown. In this embodiment of a payment system 100, a payor 100 and a payee 130 interact with an online check transfer system 190 using either a computer 120 and the Internet 150 or a phone 140 and the plain old telephone system (POTS) 155. The payee 130 also interacts with a payee bank 185 in a conventional manner to cash a negotiable instrument provided by the check transfer system 190.

The payor and payee 110, 130 can access the check transfer system using their computers 120 or phones 140. When accessing through their computers, a web browser is used in this embodiment. Other embodiments could use application software to access the check transfer system 190. For those without access to a computer 120, a phone could be used with voice prompts, touch tone recognition and/or speech recognition to interact with the check transfer system 190. Other embodiments could use additional interfaces to the check transfer system 190.

A negotiable or payment instrument is produced by the transfer system 190. Types of negotiable instruments include: a money order, a cashiers check, a certified check, a travelers check, a bank check, a bank draft, a tellers check, a gift certificate, and/or check drawn on the transfer system 190. The negotiable instrument is mailed, couriered, or otherwise sent to the payee 130, or made available for pick-up by the payee 130 at a bank or retail location. Once the payee 130 obtains the negotiable instrument, it may be cashed in the traditional way at the payee bank 185. As is well known in the art, a banking network 175 is used to clear the negotiable instrument.

The online check transfer system 190 includes payin handlers 160, affiliated national banks 165, a payment enabler 170, and user interfaces 180. The payin handlers 160 allow compensating the payment enabler 170 for the negotiable instrument and any associated fees. The payor configures these payin handlers such that the payment enabler 170 can automatically transfer in funds. The affiliated national banks 165 are the drawees for the negotiable instruments issued to payees 130. There are banks for each currency and/or jurisdiction. For example, there may be a Swiss bank that issues money orders in Euros, there may be another Swiss bank that issues money orders in Swiss francs, or there may be a French bank that issues money orders in Euros. Typically, the payee wants a negotiable instrument issued by a bank in their country that uses the currency in that country.

The user interfaces 180 accommodate the different methods the payors and payees 110, 130 use to interface with the payment enabler 170. In this embodiment, an Internet interface is provided that includes web pages for users to interact with. Also in this embodiment is a phone interface. As will be discussed below, other embodiments could have additional interfaces.

Figure 2:
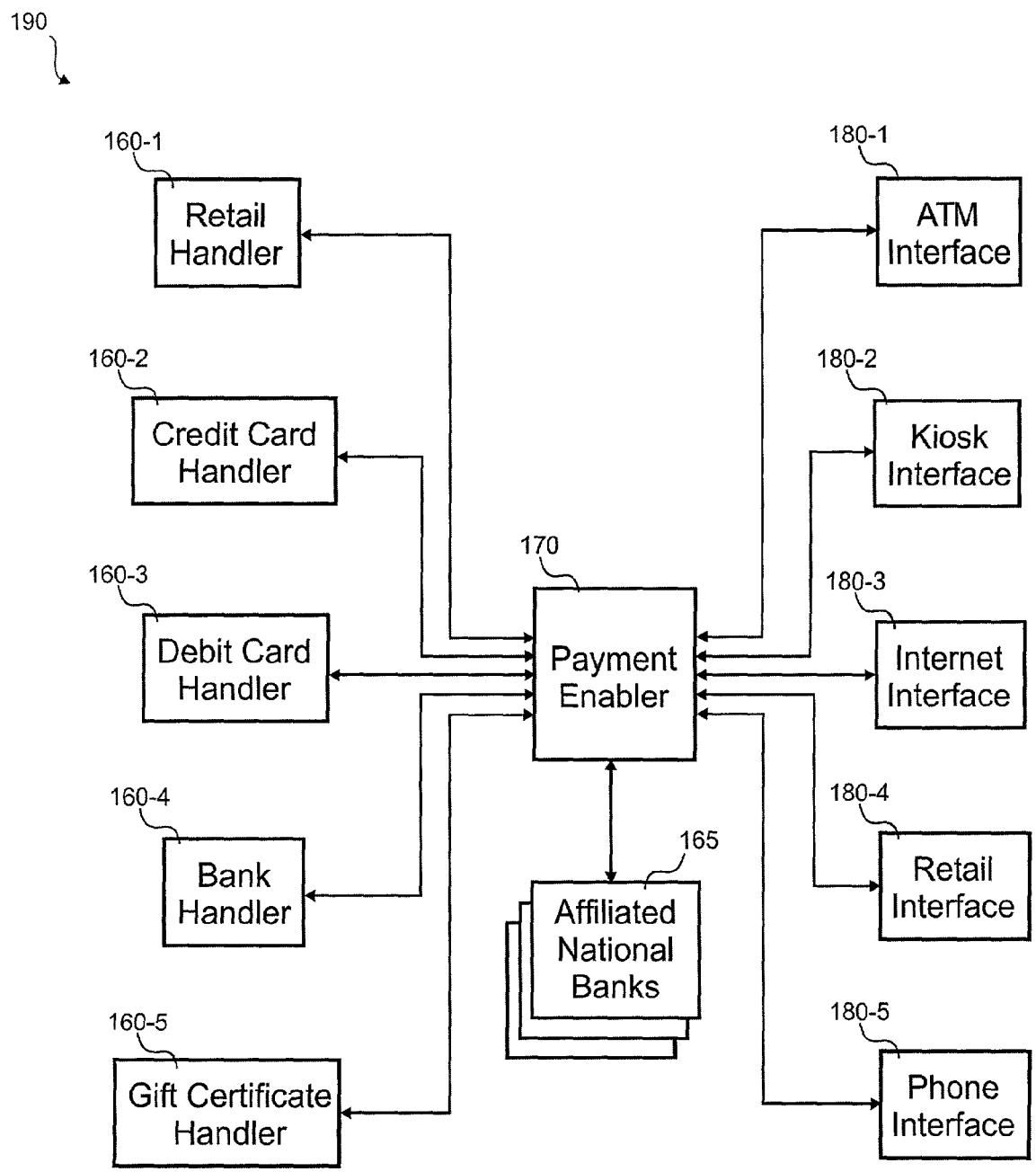
FIG. 2 is a block diagram of an embodiment of an online check transfer system.

With reference to FIG. 2, a block diagram of an embodiment of an online check transfer system 190 is shown. This embodiment has five different user interfaces 180, four different payin handlers 160 and the affiliated national banks 165. Other embodiments could have more or less interfaces 180 and handlers 160. For example, one embodiment may only accept payins from credit or debit cards and only have an Internet interface.

The payment enabler 170 has business relationships with all the affiliated national banks 165. These relationships may include an account to draw funds upon or the right to have negotiable instruments cashed at that bank 165. The currency and nationality of the negotiable instruments specified by the payee guide choosing the appropriate national bank 165 that is the drawee for the negotiable instrument. The payee may specify the default currency and nationality for all payments or the payor may specify this for a single transaction, presumably guided by the wishes of the payee.

This embodiment uses a retail handler 160-1, a credit card handler 160-2, a debit card handler 160-3, a bank handler 160-4, and a gift certificate handler 160-5. One or more of these handlers 160 can be chosen to fund a transaction. For each handler, the specifics for the account of the payor 110 are entered into the payment enabler. For the credit and debit card handlers, the payor's 110 account, name, expiration date, issuing bank, billing address, etc. may be requested. For the bank handler, the account number and routing number for the payor's account is requested such that an electronic funds transfer (EFT) request may be made. The retail handler 160-1 manually gets funds in person from the payor to pay for the transaction. In some cases, the payor 110 may have a gift certificate that is accepted by the gift certificate handler 160-5. Codes on the gift certificate are requested by the payment enabler to debit the certificate accordingly.

Although this embodiment supports a number of payin handlers 160 and a number of user interfaces 180, other embodiments could only implement a subset of either. For example, one embodiment may only allow payin with the credit card handler 160-2 using the Internet interface 180-3. Further, some embodiments could limit the types of credit cards accepted with the credit card handler 160-2. Only card issuers with special agreements with the system 100 could be used to payin funds in this embodiment.

This embodiment allow users to interface with the payment enabler 170 using any of an ATM interface 180-1, a kiosk interface 180-2, an Internet interface 180-3, a retail interface 180-4, and a phone interface 180-5. The embodiment of FIG. 1 discussed the Internet and phone interfaces 180-3, 180-5. One example of an Internet interface 180-3 is the computer 120 of the payor or payee 110, 130. The ATM interface 180-1 is embedded into an automated teller machine (ATM) which may have application software or a web browser interface to the payment enabler 170. Existing ATMs can have this functionality added to its existing banking functionalities. In a similar way, the kiosk interface 180-2 is provided in computer kiosks conveniently located near users and is interconnected to the payment enabler through a wide area network such as the Internet. The retail interface 180-4 is clerk at an retail location that can manually take information from the payor 110 for entry into some interface 180 to complete a negotiable instrument transaction.

Figure 3:
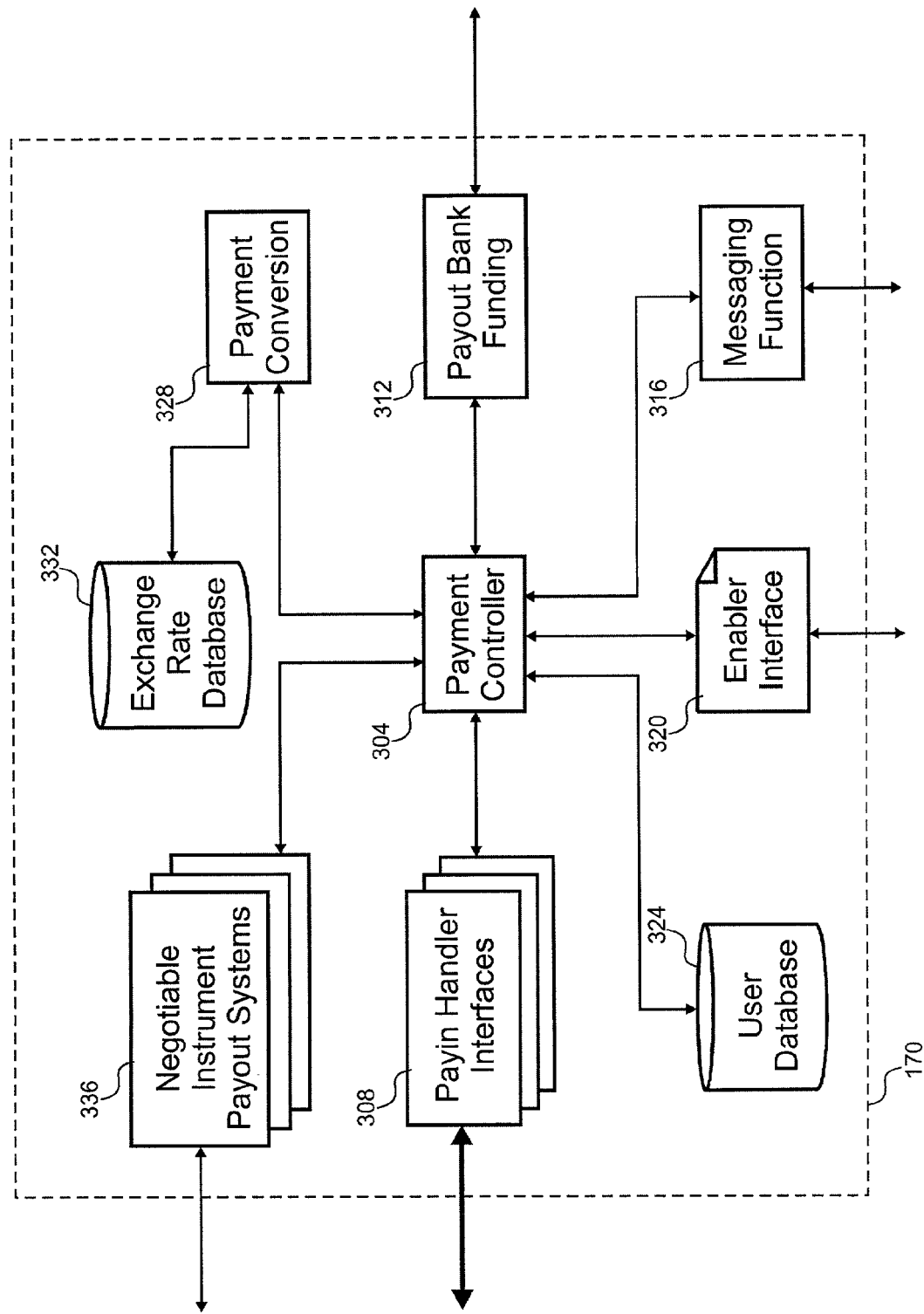
FIG. 3 is a block diagram of an embodiment of a payment enabler.

Referring next to FIG. 3, a block diagram of an embodiment of a payment enabler 170 is shown. This embodiment includes a payment controller 304, payin handler intervaces 308, a payout bank funding function 312, a messaging function 316, an enabler interface 320, a user database 324, a payment conversion function 328, an exchange rate database 332, and negotiable instrument payout systems 336. This embodiment interfaces with users using the Internet. These blocks of the diagram may be arranged differently or have their functionality combined or separated on various computers, systems and/or locations as is well known in the art.

The payment controller 304 manages operation of the payment enabler 170. This intelligence is shown as one block in FIG. 3, but could be spread out throughout the payment enabler 170. Information gathered from the users and transactions is stored by the payment controller 304 in the user database 304. This information can be viewed and/or modified by the users through the enabler interface 320.

The enabler interface 320 and messaging function 316 are the communication mechanisms used by the payment enabler 170 and users. The enabler interface 320 includes a set of web pages for entering information for transactions and viewing information about a user's account. These web pages may be viewed through the ATM interface 108-1, kiosk interface 180-2, Internet interface 180-3, or retail interface 180-4 in various embodiments. Messages relating to the user accounts or transactions are sent by the messaging function 316. This embodiment of the messaging function 316 uses e-mail, but other embodiments could use wireless pages, WAP messages, voice mail, instant messages, network broadcasts, or other means to contact the users.

Affiliated national banks 165 are used to back the negotiable instruments given to the payees 130. The payees 130 may be in different countries and/or use different currencies. The negotiable instruments are printed on one or more payout systems 336 and mailed or couriered to the payee 130. In this embodiment, there are two payout systems 336, namely, one for United States payees and one for payees outside the United States. These payout systems 336 may or may not be affiliated with the payment enabler 170 in various embodiments. In some embodiments, the payout system 336 may be part of a retail location as described below. When a negotiable instrument is issued, the payout bank funding function 312 may be used to transfer adequate funds to the bank that backs the negotiable instrument. This funding may happen before or after presentment by the payee 130 through the banking network 175.

Funds are added to the payment enabler 170 by the payor 110 to fund the transaction by use of a handler 160. These handlers 160 are manipulated by the payin handler interfaces 308. These interfaces 308 use the account information entered by the user and stored in the user database 324 to draw funds to pay for the negotiable instrument and any associated fees. In this embodiment, the payor 110 is charged a flat fee for the negotiable instrument, but the payee 130 is charged for any currency conversion expenses. Other embodiments could assign these fees differently among the parties 110, 130.

The payee 130 can choose to receive funds in a particular currency and drawn on a bank with a specified nationality. As funds are received or after an event is triggered, these funds are converted and a service fee may be deducted. The payment conversion function 328 queries the exchange rate database 332 when one of these conversions is requested by the payment controller 364. The exchange rate database 332 is updated daily or at some other frequency to reflect changes in the currency markets. The rate may incorporate a service fee in lieu of or in addition to any other fees.

Figure 4:
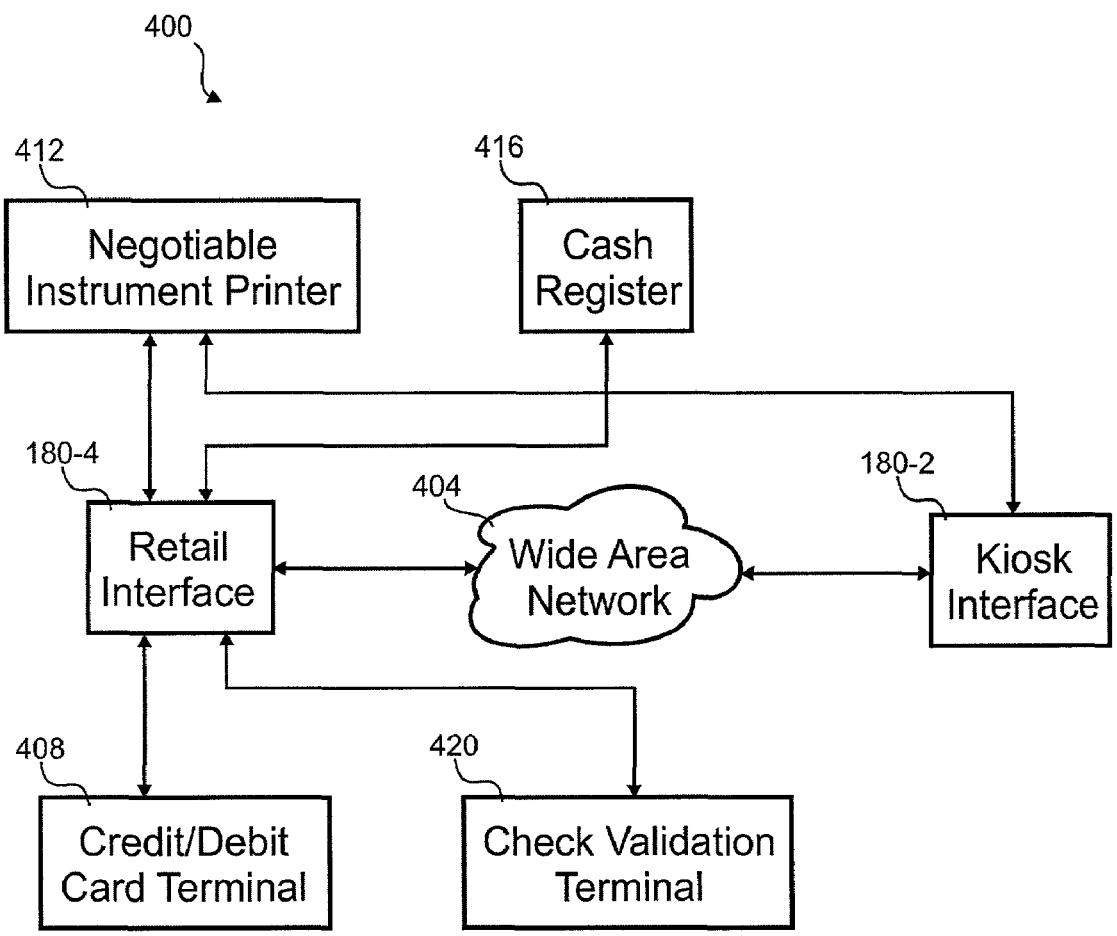
FIG. 4 is a block diagram of an embodiment of a retail location.

With reference to FIG. 4, a block diagram of an embodiment of a retail location 400 is shown. The retail location 400 can be used by the payor 110 to initiate and/or fund a transaction and by the payee 130 to receive and/or cash the negotiable instrument. Also, any user can use the retail location to manage their accounts with the payment enabler 170. Both the retail and kiosk interfaces 180-2, 180-4 are coupled to a wide area network 404 that is coupled to the payment enabler 170. The retail location 400 may be used as a retail handler 160-1 to accept money in the form of check, money order, cash, gift certificate, etc. for funding a transaction. In this embodiment, the retail location 400 is a physical store front.

The kiosk interface 180-2 is primarily intended for users to interact with, and the retail interface 180-4 is primarily intended for an agent at the retail location to interact with. In some embodiments, both interfaces 180-2, 180-4 are used to perform a transfer. For example, the agent may use the retail interface 180-4 to perform the transfer while the kiosk interface 180-2 is used to monitor the agent's actions and enter a password or PIN that is kept secret from the agent. The kiosk interface 180-2 may also be used to perform a complete transfer in circumstances where the user 110, 130 is trained to use the system 100, but does not utilize other interfaces 180 for whatever reason.

The retail interface 180-4 and kiosk interface 180-2 can output a negotiable instrument with a printer 412. The payee 130 or agent can use the printer when an in-person pick-up of the negotiable instrument is desired by the payee 130. In some embodiments, each interface 180-2, 180-4 may have a separate printer. The printer 412 may also be used to print receipts and messages related to the sending of a negotiable instrument.

Money can be added to or removed from the payment enabler 170 at the retail location 400 with money distribution devices 408, 416, 420. In the conventional manner, cash can be received by the cash register, credit or debit cards and be debited by the card terminal 408, and checks can be confirmed with a check validation terminal 420. Cash can be paid out from the cash register 416 or added to a credit or debit card by the card terminal 408 in a conventional fashion. These money distribution devices 408, 416, 420 all interface with the system 100 by way of the retail interface 180-4 such that pay-outs and pay-ins can be automatically recorded by the payment enabler 170. Other embodiments may only accept credit or debit cards to find a transaction and may not allow printing or cashing of the negotiable instrument at the retail location.

Figure 5A:
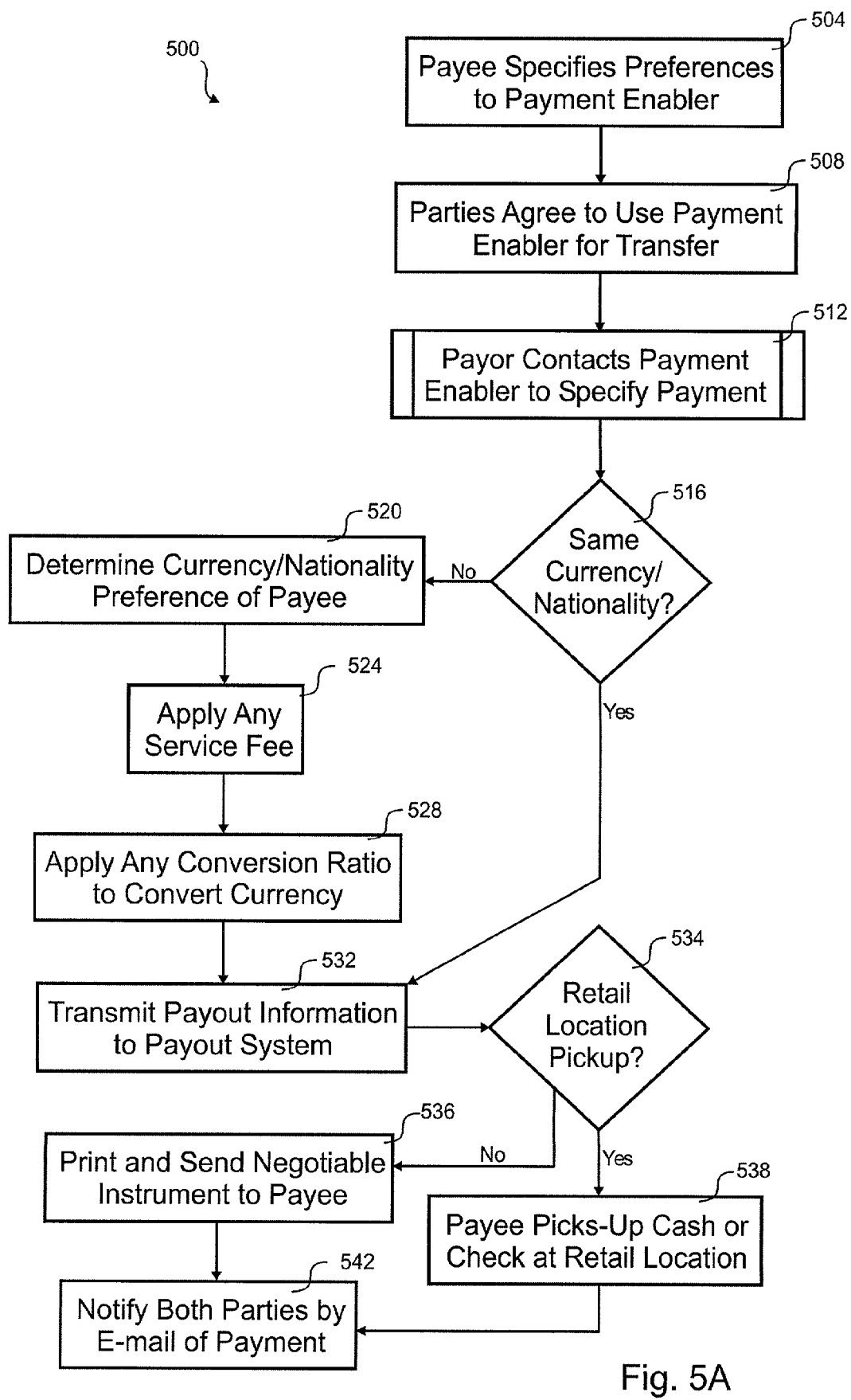
FIG. 5A is a flow diagram of an embodiment of a process for paying a payee for a transaction with funds that may be in a currency different from the one used by the payor.

Referring next to FIG. 5A, a flow diagram of an embodiment of a process 500 for paying a payee 130 for a transaction with funds is shown that may be in a currency different from the one used by the payor 110 and may be drawn on a bank in another country. In this embodiment, a negotiable instrument is produced after each transaction. The depicted portion of the process begins in step 504 where the payee 130 may specify preferences to the payment enabler 170 which would include currency and nationality of the negotiable instrument, payment address, e-mail address, etc. Where no information is available on the payee 130, the payment enabler 170 presumes the currency and nationality of the negotiable instrument is the same as the payor 110.

In this embodiment, a vending site such as an auction site or classified ad site precipitates the payment with the negotiable instrument. Through use of a button in the listing on the vending site or other communication, the payor or buyer 110 knows the payee or seller 130 accepts negotiable instruments from the payment enabler 170. In any event, the parties 110, 130 agree to use the payment enabler 170 to pay for the items in the listing. In step 512, the payor 110 contacts the payment enabler 170 to arrange payment by specifying the handler information and transaction information. A fee is also charged to the payor 110 through the handler 160. Some embodiments may notify the payee 130 of the impending negotiable instrument sending such that the payee 130 can modify the delivery address, currency or nationality of the negotiable instrument before it is sent.

In step 516, a determination is made as to the currency and nationality of the payor 110 and payee 130. In certain cases, the currency may be the same (e.g., Euro), but the parties may be in different European Union countries such that the payee 130 would prefer a negotiable instrument drawn on a bank in the payee's same country. Where either currency or nationality is different, processing proceeds to step 520 where the preference of the payee 130 is determined. In step 524, a service fee is applied to the payee's payout. The fee may be split into one fee for different currencies and another fee for different nationalities.

Although the payee 130 can specify preferences for the currency and bank nationality in this embodiment, other embodiments may work differently. For example, the payee 130 may only be able to specify the currency to use. A default bank for that currency would issue the check. That default bank may or may not have the same nationality of the payee 130. Where there is a choice of bank nationalities for a currency, the payee 130 may be given a choice and/or the system may have a default choice corresponding to the payee's nationality. In another example, the payee 130 may specify only the bank nationality that should issue the check. A default currency would be used for the check. Where the issuing bank supports multiple currencies, the payee 130 could override a default to specify one of the optional currencies.

In step 528, the currency is exchanged by the payment conversion function 328. The payout information is transferred to the appropriate payout system 336 in step 532. Processing also continues from step 516 to step 532 where the currency and nationality of the negotiable instrument is the same.

The payee 130 back in step 504 or the payor 110 could have indicated that the payee 130 would pick-up the negotiable instrument at a specific or any retail location 400. In step 534, a determination is made as to whether a retail location pick-up is desired by the payee 130. Where sending the negotiable instrument is desired, the instrument is printed and sent by the payout system 336 in step 536 to a provided address. Alternatively, the payee 130 picks-up the negotiable instrument in step 538 where a retail location pick-up is specified. The negotiable instrument may be cashed at the retail location 400 or the agent could provide cash without printing the negotiable instrument. Regardless of how the negotiable instrument or cash is received, an e-mail is sent to the parties in step 542 to indicate successful payment for the listing.

Figure 5B:
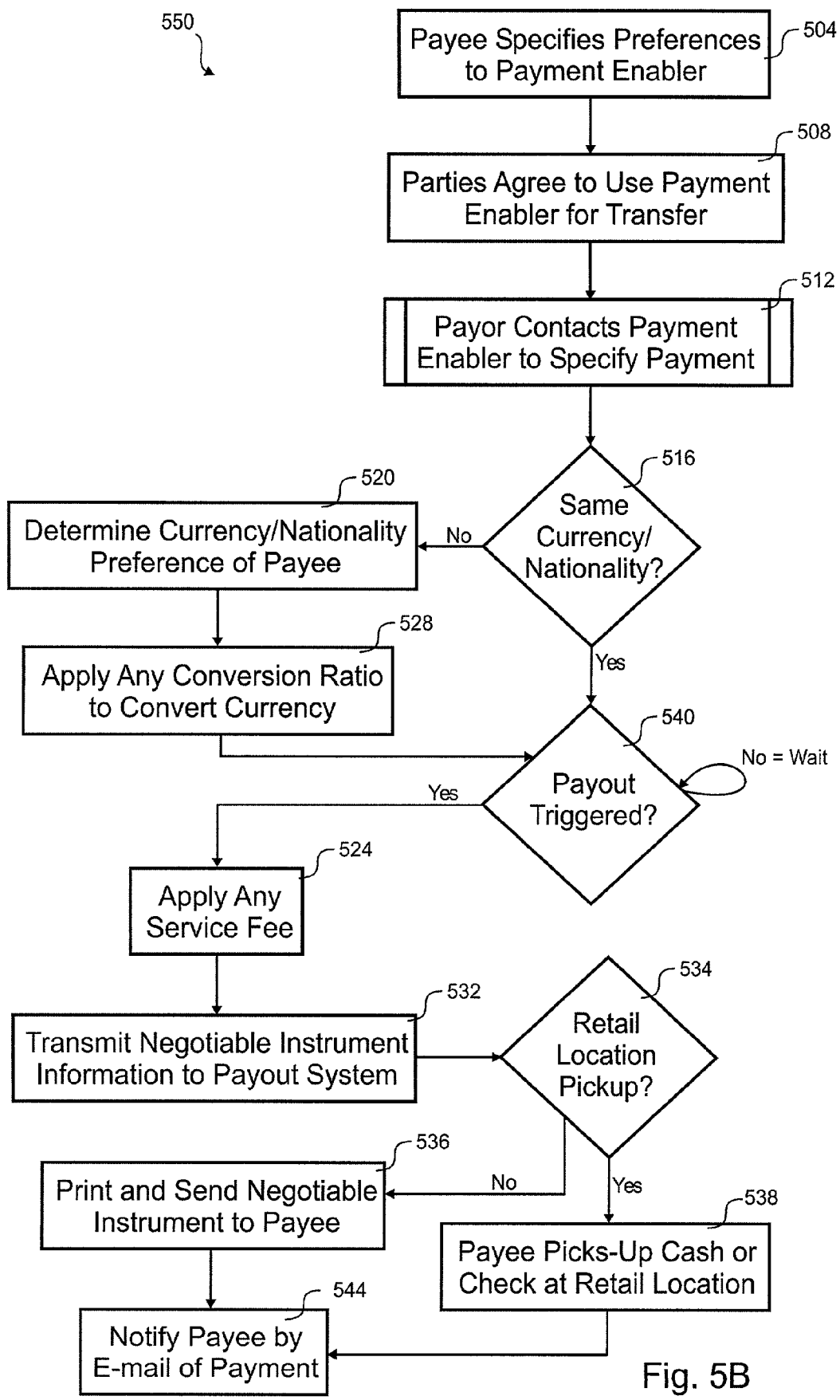
FIG. 5B is a flow diagram of an embodiment of a process for paying a payee for a transaction where the payout may be aggregated until a triggering event.

With reference to FIG. 5B, a flow diagram of an embodiment of a process 550 for paying a payee 130 for a transaction is shown where the payout may be aggregated until a triggering event. There are two types of events that may trigger payouts, namely, temporal events and monetary events. Temporal events could be a time period, a calendar date or a specified day in a month and monetary events could be reaching a certain threshold credit amount. In some cases a temporal event and a monetary event must be satisfied. For example, a negotiable instrument is issued if the balance exceeds $500 at the fifteenth day of the month. Reducing the payouts reduces the number of fees charged in this embodiment. Through steps 516 and 520, FIG. 5B is largely the same as FIG. 5A.

Each payment from a payor 110 is converted into the target currency in step 528. The payments are aggregated in a stored value fund that may or may not accrue interest. In step 540 the events are tested to see if they are satisfied and if a payout is triggered. Where the events are not satisfied, more payments are aggregated. When a payout is triggered in step 540, processing continues to step 524 where a service fee is applied for issuing the negotiable instrument. The information for the negotiable instrument is transmitted to the proper payout system 336 in step 532. As with the embodiment of FIG. 5A, the payee may pick-up the negotiable instrument or have it mailed in steps 534, 536 and 538. Once the negotiable instrument is disbursed, an e-mail is sent to the payee 130 in step 544. The payor 110 is notified by e-mail once the payment is accepted after step 516.

Figure 6:
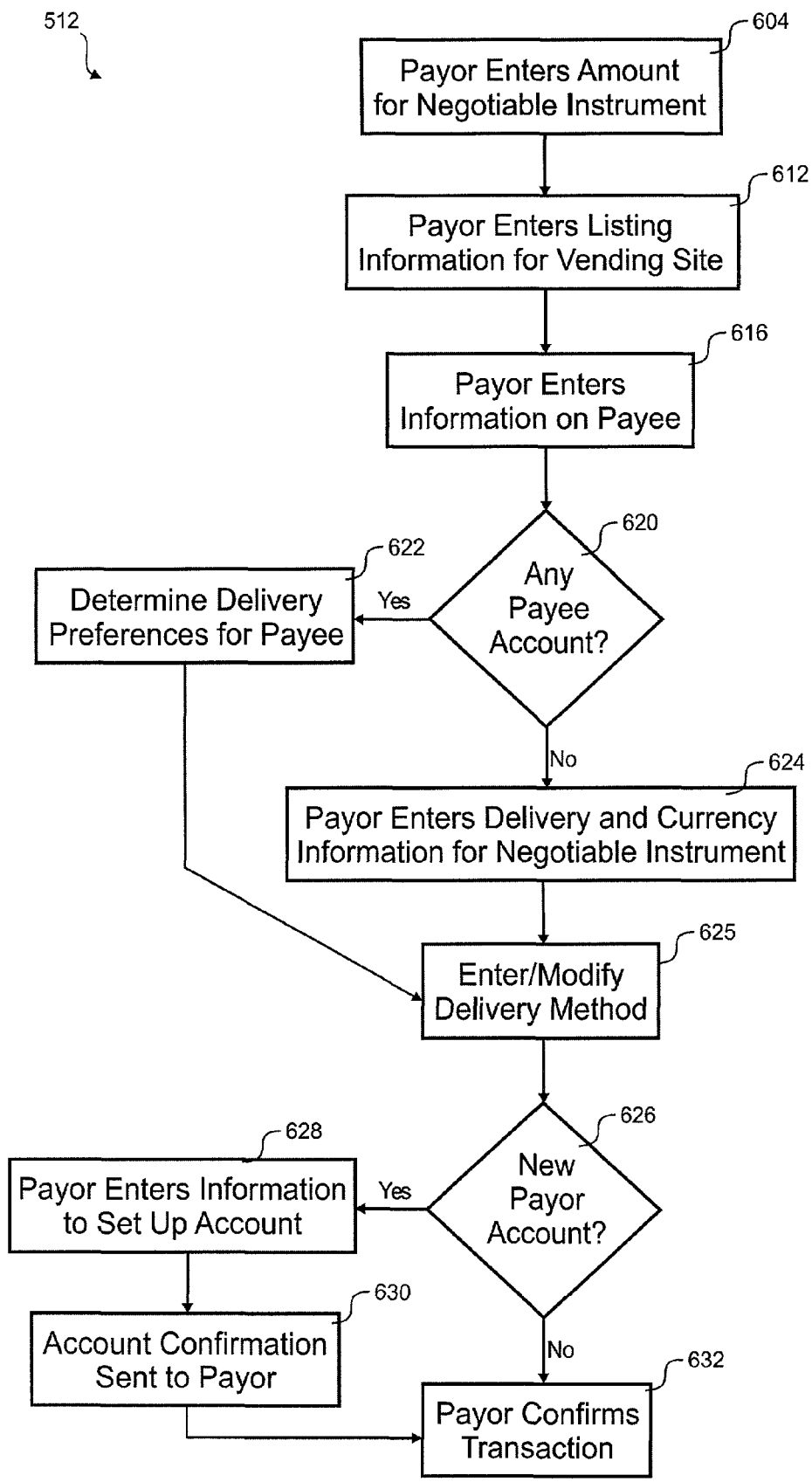
FIG. 6 is a flow diagram of an embodiment of a process for initiating payment with the payment enabler.

Referring next to FIG. 6, a flow diagram of an embodiment of a process 512 for initiating payment with the payment enabler 170 is shown. In this embodiment, the payee may or may not have an account with the payment enabler 170. Where there is an account, the payor 110 may have some fields prepopulated with information about the payee. The depicted portion of the process begins in step 604 where the payor 110 enters an amount for the negotiable instruments. The payment enabler 170 may reject amounts that are too large or too small.

Information about the listing and the vending site are entered in step 612. This information will be shown in status fields when the parties review their account history and may also be printed on the check itself. In some cases, the information on the vending site and listing is verified before allowing the payor 110 to continue. In step 616, information on the payee is entered, such as an identifier. This embodiment uses an e-mail address as an identifier, but an identifier for the payment enabler 170 could be used or an identifier used by the vending site could be used.

If an account can be found in the user database 324 for the payee 130 in step 620, delivery preference information is retrieved from that database 324 in step 622. This preference information includes delivery method, delivery address, currency, and drawee nationality. Where an account cannot be located in step 620, the payor 110 enters the address, currency, and drawee nationality for the payee 130 in step 624. In step 625, the payor can enter or modify the delivery method for the negotiable instrument regardless of whether the payee 130 has an account. In some embodiments, the payee could specify that the delivery method and other preferences cannot be modified by the payor 110.

Where the payor 110 is new to the payment enabler 170 as determined in step 626, a new account can be set up in step 628 and confirmed by e-mail in step 630. Once the payor account is opened or verified, the information on the transaction is presented to the payor 110 for a final verification in step 632. After any changes are made, the payor 110 can complete the depicted portion of the process by accepting the terms.

A number of variations and modifications of the invention can also be used. For example, the payment enabler could be integrated into the vending site, for example, integrated into an auction site. With the embodiment of FIG. 5B, the service fee applied in step could be scaled per negotiable instrument or per payment received from a payor. In some of the above embodiments, the negotiable instrument is mailed, couriered, or otherwise sent to the payee, or made available for pick-up by the payee at a bank or retail location. In other embodiments, negotiable instrument could take the form of an electronic transfer to a bank account of a different nationality than the payor or in a currency different than the currency of the payor.

While the principles of the invention have been described above in connection with specific apparatuses and methods, it is to be clearly understood that this description is made only by way of example and not as limitation on the scope of the invention.

What is claimed is:

1. A method for purchasing an international payment instrument from an online payment system by a payor to compensate a payee in relation to a listing on a vending site, the method comprising steps of:
 receiving, at a payment server, selection of a payment currency and a drawee bank nationality for the online payment system to use when issuing the international payment instrument;
 receiving, at the payment server, payment information from the payor comprising: a payee identifier, a payee name, a payee address, and a payment amount;
 debiting, by the payment server, a money handler associated with the payor and separate from the payment server for at least the payment amount;
 determining, by the payment server, that the drawee bank nationality is different from a payee nationality;
 determining, by the payment server, that a payor currency is different from a payee currency;
 based on the determination that the drawee bank nationality is different from the payee nationality and that the payor currency is different from the payee currency, applying, at the payment server, a service fee to the payor, wherein the service fee is split into two separate fees including a first fee associated with the difference in nationality and a second fee associated with the difference in currency;
 determining, by the payment server, an exchange rate between the payor currency and the payee currency;
 causing, by the payment server, generation of the international payment instrument payable to the payee name for the payment amount, wherein:
 the payment instrument is based on the received payment currency, the drawee bank nationality, first service fee, second service fee, and exchange rate, and wherein the payor currency is different from the payee currency used by the money handler; and
 causing, by the payment server, delivery of the international payment instrument to the payee at a location within the country of the payee.

2. The method for purchasing the payment instrument from the online payment system by the payor to compensate the payee in relation to the listing on the vending site as recited in claim 1, further comprising a step of determining if an event has occurred before performing the causing generation step.

3. The method for purchasing the payment instrument from the online payment system by the payor to compensate the payee in relation to the listing on the vending site as recited in claim 1, further comprising:
 causing by the payment server a user interface configured to accept a user input of the at least one of the payment currency and the drawee bank nationality, and
 wherein the first-listed receiving step receives the selection from the payee.

4. The method for purchasing the payment instrument from the online payment system by the payor to compensate the payee in relation to the listing on the vending site as recited in claim 1 purchasing an international payment instrument from an online payment system by a payor to compensate a payee in relation to a listing on a vending site.

5. The method for purchasing the payment instrument from the online payment system by the payor to compensate the payee in relation to the listing on the vending site as recited in claim 1, wherein the payee identifier is an e-mail address associated with the payee.

6. The method for purchasing the payment instrument from the online payment system by the payor to compensate the payee in relation to the listing on the vending site as recited in claim 1, wherein the causing delivery step comprises delivering the payment instrument to the payee at a retail location upon request by the payee.

7. The method for purchasing the payment instrument from the online payment system by the payor to compensate the payee in relation to the listing on the vending site as recited in claim 1, wherein the causing delivery step comprises causing delivery of the payment instrument at the payee address.

8. The method for purchasing the payment instrument from the online payment system by the payor to compensate the payee in relation to the listing on the vending site as recited in claim 1, wherein the payor specifies the payee identifier and the payment amount in the second-listed receiving step and the payee specifies the payee address at some other time.

9. A non-transitory computer-readable medium for purchasing an international payment instrument from an online payment system by a payor to compensate a payee in relation to a listing on a vending site, having sets of instructions stored thereon which, when executed by a computer, cause the computer to:
 receive a selection of a payment currency and a drawee bank nationality for the online payment system to use when issuing the international payment instrument;
 receive payment information from the payor comprising a payee identifier, a payee name, a payee address, and a payment amount;
 debit a money handler associated with the payor and separate from the online payment system for at least the payment amount;
 determine that the drawee bank nationality is different from a payee nationality;
 determine that a payor currency is different from a payee currency;
 based on the determination that the drawee bank nationality is different from the payee nationality and that the payor currency is different from the payee currency, apply a service fee to the payor, wherein the service fee is split into two separate fees including a first fee associated with the difference in nationality and a second fee associated with the difference in currency;
 determine an exchange rate between the payor currency and the payee currency;
 cause generation of the international payment instrument payable to the payee name for the payment amount, wherein the international payment instrument is based on the received payment currency, the drawee bank nationality, first service fee, second service fee, and exchange rate, and wherein the payor currency is different from the payee currency used by the money handler; and
 cause delivery of the international payment instrument to the payee at a location within the country of the payee.

10. The non-transitory computer-readable medium of claim 9, wherein the payee identifier is an e-mail address associated with the payee.

11. The non-transitory computer-readable medium of claim 9, wherein the causing delivery step comprises delivering the international payment instrument to the payee at a retail location upon request by the payee.

12. The non-transitory computer-readable medium of claim 9, wherein the causing delivery step comprises causing delivery of the international payment instrument at the payee address.

13. The non-transitory computer-readable medium of claim 9, wherein the payor specifies the payee identifier and the payment amount in the second-listed receiving step and the payee specifies the payee address at some other time.

14. A system for purchasing an international payment instrument from an online payment system by a payor to compensate a payee in relation to a listing on a vending site, the system comprising:
- a memory device; and
- a computer processor in communication with the memory device, wherein the memory device has sets of instructions stored thereon which, when executed by the computer processor, cause the computer processor to:
  - receive a selection of a payment currency and a drawee bank nationality for the online payment system to use when issuing the international payment instrument;
  - receive payment information from the payor comprising a payee identifier, a payee name, a payee address, and a payment amount;
  - debit a money handler associated with the payor and separate from the online payment system for at least the payment amount;
  - determine that the drawee bank nationality is different from the payee nationality;
  - determine that a payor currency is different from a payee currency;
  - based on the determination that the drawee bank nationality is different from the payee nationality and that the payor currency is different from the payee currency, apply a service fee to the payor, wherein the service fee is split into two separate fees including a first fee associated with the difference in nationality and a second fee associated with the difference in currency;
  - determine an exchange rate between the payor currency and the payee currency;
  - cause generation of the international payment instrument payable to the payee name for the payment amount, wherein the international payment instrument is based on the received payment currency, the drawee bank nationality, first service fee, second service fee, and exchange rate, and wherein the payor currency is different from the payee currency used by the money handler; and
  - cause delivery of the international payment instrument to the payee at a location within the country of the payee.

15. The system of claim 14, wherein the payee identifier is an e-mail address associated with the payee.

16. The system of claim 14, wherein the causing delivery step comprises delivering the international payment instrument to the payee at a retail location upon request by the payee.

17. The system of claim 14, wherein the causing delivery step comprises causing delivery of the international payment instrument at the payee address.

18. The system of claim 14, wherein the payor specifies the payee identifier and the payment amount in the second-listed receiving step and the payee specifies the payee address at some other time.

* * * * *